United States Patent [19]

Sigmund et al.

[11] 4,297,329
[45] Oct. 27, 1981

[54] VAPOR-LIQUID CONTACTING SYSTEM

[75] Inventors: Paul W. Sigmund, Tarrytown; Kenneth F. Butwell, Newburgh, both of N.Y.

[73] Assignee: Union Carbide Corporation, New York, N.Y.

[21] Appl. No.: 149,733

[22] Filed: May 14, 1980

Related U.S. Application Data

[62] Division of Ser. No. 863,350, Dec. 22, 1977, abandoned.

[51] Int. Cl.$^3$ .............................................. B01D 53/34
[52] U.S. Cl. .................................... 423/228; 423/220; 423/229; 261/114 R
[58] Field of Search ............... 423/220, 226, 228, 229, 423/242; 261/114 R; 55/73, 68

[56] References Cited

U.S. PATENT DOCUMENTS

| | | | |
|---|---|---|---|
| 415,133 | 11/1889 | Wood | 261/114 R |
| 2,608,461 | 8/1952 | Frazier | 423/229 |
| 2,672,330 | 3/1954 | Swenson | 261/114 R |
| 3,218,781 | 11/1965 | Allemann et al. | 261/114 R |
| 3,410,540 | 11/1968 | Bruckert | 261/114 R |
| 3,489,506 | 1/1970 | Galstaun et al. | 423/228 X |
| 3,829,521 | 8/1974 | Green | 423/228 X |
| 3,892,837 | 7/1975 | Uchiyama et al. | 423/242 A |
| 3,958,964 | 5/1976 | Koch | 261/114 R |
| 3,961,015 | 6/1976 | Dailey | 423/229 |
| 3,965,244 | 6/1976 | Sykes, Jr. | 423/228 |
| 4,099,925 | 7/1968 | Yanagioha et al. | 55/73 |

FOREIGN PATENT DOCUMENTS

| | | | |
|---|---|---|---|
| 724635 | 12/1965 | Canada | 261/114 R |
| 947045 | 5/1974 | Canada | 423/228 |
| 312719 | 4/1956 | Switzerland | 261/114 R |
| 823108 | 11/1959 | United Kingdom | 261/114 R |

OTHER PUBLICATIONS

Miller et al., "Selective Adsorption of Hydrogen Sulfide", The Oil and Gas Journal, Apr. 27, 1953, pp. 175, 176, 178, 180 & 183.
Kobe et al., "Advances in Petroleum Chemistry and Refining", vol. 1, Interscience Publishers, 1958.

Primary Examiner—Earl C. Thomas
Attorney, Agent, or Firm—Dominic J. Terminello

[57] ABSTRACT

A vapor-liquid contacting tray wherein a perforated portion of the tray member forms an active surface area for vapor-liquid contact in the interior of the tray member. The active surface area portion of the tray member is circumscribed by an imperforate peripheral portion of the tray member with a width of from 0.05 to 0.35 times the radius of the tray. The disclosed tray provides upwardly directed laminar jetting of liquid over the tray perforation openings for high selectivity vapor-liquid contacting and has particular utility in the absorption of hydrogen sulfide from a gas mixture containing hydrogen sulfide and carbon dioxide.

3 Claims, 8 Drawing Figures

VAPOR-LIQUID CONTACTING SYSTEM

This application is a division of our prior U.S. application: Ser. No. 863,350 Filing Date Dec. 22, 1977, and now abandoned.

BACKGROUND OF THE INVENTION

1. Field of the Invention

This invention relates to a vapor-liquid contacting system having particular utility in selective absorption applications.

2. Description of the Prior Art

In the art of mass transfer for selectively separating at least one component from a mixture of at least two constituents as for example in distillation and absorption applications, an upwardly flowing vapor or gas stream is typically contacted on a substantially horizontally aligned contacting surface with a generally downwardly flowing liquid stream. In a conventional absorption process, wherein a liquid solvent is employed to remove undesired constituents from the gas or vapor stream, such contacting permits the upwardly flowing vapor or gas stream to become selectively depleted in the soluble components of the gas mixture, while the generally downwardly flowing liquid stream becomes selectively enriched with the soluble constituents.

A variety of types of vapor-liquid contacting trays have been conventionally employed in the above-described mass transfer operations, to effect intimate contacting between the respective gas and liquid phases. In such applications, much effort has been expended to maximize contacting efficiency in every way possible. In these applications, tray design becomes complex because of the multiplicity of process variables and the hydraulic interrelationships between them. Contacting efficiency is related to the degree of dispersion between the respective phases to provide maximum interfacial area, adequate residence time for reaction, and good agitation in the respective phases to insure high mass transfer rates. Heretofore, high efficiency has been measured by close approaches to equilibrium, with a theoretical tray or transfer unit reflecting a 100% approach to equilibrium between the contacted phases. Close equilibrium approaches have been the goal of conventional tray design, regardless of whether the mass transfer system is gas film or liquid film controlled.

In many commercial absorption and distillation applications, the contacting operation is liquid film controlled, i.e., the liquid film resistance to mass transfer is substantially greater than the gas film resistance. In such applications, the goal of contacting tray design is to establish high liquid phase mass transfer rates. This goal generally dictates the achievement of highly agitated and dispersed liquid phase by means of the tray design. A highly agitated and dispersed liquid phase enhances contacting efficiency in liquid film controlled systems for the following reasons. First, by effecting vigorous bubbling of the liquid phase on the tray surface, the liquid phase is broken up and dispersed into thin films between adjacent gas bubbles. These bubbles are rapidly propagated and broken as gas passes upward through the tray gas flow openings and the liquid supported on the tray. In this manner, the liquid is continually agitated in a finely-divided manner. Such action yields a high degree of liquid turbulence. Secondly, a high extent of interfacial area between the respective phases is obtained by vigorous bubbling action.

In the aforementioned contacting systems wherein the contacting reaction is liquid film controlled, the vigorous bubbling action may to some extent be increased by increases in vapor velocity. The limits of tray operability and stability are quickly reached, however, since at high gas flow velocities liquid on the tray surface is sprayed into the gas space between adjacent contacting trays in the system, resulting in entrainment of the liquid in the upflowing gas. Such entrainment lowers the contacting efficiency of the trays and the contacting system as a whole.

In a contacting system where two absorption reactions are occurring simultaneously, each mass transfer rate controlled in a different phase, a most difficult problem is encountered where it is sought to selectively maximize one rate relative to another. For example, in the selective absorption of hydrogen sulfide from a gas mixture containing hydrogen sulfide and carbon dioxide by an amine liquid solvent, it is desirable to maximize the gas film limited hydrogen sulfide absorption rate, and to mimimize the liquid film limited carbon dioxide absorption rate. Inasmuch as the rate limiting step for each component in this gas mixture is known, it would be relatively simple to selectively maximize one rate relative to the other if it were possible to manipulate the mass transfer characteristics of each phase independently. The goal of the tray design for such a system, simply stated, would be to create a highly turbulent gas phase, with a relatively quiescent liquid phase. However, it is not possible to increase gas velocity in a conventionally designed contacting system so as to increase the turbulence in the gas phase without further agitating the liquid phase and improving its mass transfer properties for the undesirable liquid film limited constituent. Any increase in vapor velocity, in addition to agitating the liquid phase, increases liquid surface area and liquid residence time on the contacting tray. Furthermore, in the selective absorption of hydrogen sulfide from a gas mixture containing hydrogen sulfide and carbon dioxide, not only is it desirable to enhance gas phase mass transfer relative to liquid phase mass transfer, but it is also desirable to provide a relatively short liquid residence time so as to limit the net absorption of the undesirable component carbon dioxide. This is due to the fact that at increased carbon dioxide concentrations in the liquid phase, the mass transfer rate of hydrogen sulfide decreases. Thus, it is desirable to depart as far as possible from solution equilibrium of carbon dioxide so as to maintain maximum selectivity toward hydrogen sulfide by the solvent liquid.

For the foregoing reasons, conventional vapor-liquid contacting trays, which are designed for maximum approach to vapor-liquid contacting equilibrium, perform poorly in applications where it is desired to maximize the absorption of a gas film limited constituent while minimizing the absorption of a liquid film limited constituent.

Accordingly, it is an object of the present invention to provide an improved vapor-liquid contacting tray for selectively absorbing a constituent from a gas mixture which is gas film limited relative to an undesired constituent of the gas mixture which is liquid film limited.

It is another object of the present invention to provide an improved process for absorbing hydrogen sulfide from a gas mixture containing hydrogen sulfide and carbon dioxide by an amine liquid solvent in an absorption zone containing a plurality of generally horizontally aligned, vertically spaced-apart perforated trays on which liquid solvent, flowing generally downwardly through the adsorption zone from tray to tray, is contacted with upwardly flowing gas mixture.

Other objects and advantages of the present invention will be apparent from the ensuing disclosure and appended claims.

SUMMARY OF THE INVENTION

This invention relates to an improved vapor-liquid contacting system having particular utility in absorption applications.

In one aspect, the invention relates to a vapor-liquid contacting tray for use in a contacting column to effect intimate contact between rising vapor and liquid flowing on a generally horizontally aligned member of the tray having main flat top and bottom surfaces along a liquid flow path on the main flat top surface to liquid discharge downcomer means extending upwardly above the main flat top surface of the tray member to maintain a predetermined height of liquid thereon. The tray has a plurality of fixed size perforation openings distributed across a portion of the tray member and extending therethrough with walls normal to the main flat top and bottom surfaces for gas flow into the liquid on the main flat top surface of the tray member. In the contacting column in which the vapor-liquid contacting tray is employed, the tray is bounded at its edges by an inner wall of the column.

In accordance with the improvement of the present invention, the perforated portion of the tray member forms an active surface area for vapor-liquid contact in the interior of the tray member, with a perforation area of from 3 to 5% based on total area of the tray member. The fixed size perforation openings have a diameter of from 1/16 to 3/32 inch. The active surface area portion of the tray member is circumscribed by an imperforate peripheral portion of the tray member with a width of from 0.05 to 0.35 times the radius of the tray, to prevent interference by the inner wall of the contacting column with vapor-liquid contacting above the active surface area portion of the tray member. The downcomer means have a height measured from the main flat top surface of the tray member of from $\frac{1}{8}$ to $\frac{3}{8}$ inch.

In a preferred embodiment of the above-described tray, the fixed size openings are uniformly distributed across the active surface area portion of the tray member in a regular pattern with a pitch of from $\frac{1}{4}$ to $\frac{3}{8}$ inch.

In another aspect, the invention relates to a process for absorbing hydrogen sulfide from a gas mixture containing hydrogen sulfide and carbon dioxide by an amine liquid solvent in an absorption zone containing a plurality of generally horizontally aligned, vertically spaced-apart perforated trays on which liquid solvent, flowing generally downwardly through the absorption zone from tray to tray, is contacted with upwardly flowing gas mixture.

In accordance with the improvement of the invention, an open area of from 3 to 5% is provided on each of the trays, formed by fixed size perforation openings of from 1/16 to 3/32 inch diameter. The gas mixture is flowed through the open area perforation openings at a velocity of from 50 to 133 ft./sec. The liquid height of the amine solvent on the trays is maintained in the range of from $\frac{1}{8}$ to $\frac{3}{8}$ inch, whereby upwardly directed laminar jetting of liquid is obtained over the tray perforation openings for enhanced solvent-gas mixture contacting and selective hydrogen sulfide absorption.

DETAILED DESCRIPTION OF THE PREFERRED EMBODIMENTS

Figure 1:
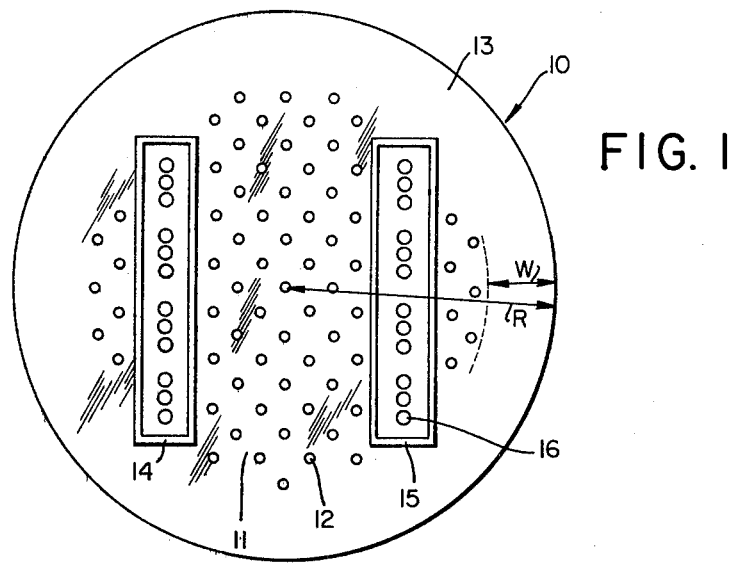
FIG. 1 is a plan view of a vapor-liquid contacting tray constructed in accordance with the invention.

As discussed earlier herein, the absorption of hydrogen sulfide from a gas mixture containing hydrogen sulfide and carbon dioxide by an amine liquid solvent involves competing absorption reactions, each controlled in a different physical phase. The absorption of hydrogen sulfide by the solvent is gas phase controlled, i.e., the gas phase film resistance to mass transfer is controlling. By contrast, the absorption of the undesired component carbon dioxide in the amine solvent is liquid film limited, that is, the liquid film resistance to mass transfer is the limiting resistance for mass transfer. In addition to being undesirable per se in the liquid solvent phase, carbon dioxide has an adverse affect on the mass transfer of hydrogen sulfide into the solvent when the former is present in appreciable concentrations in the liquid solvent.

On the basis of the foregoing, it is possible to define the desired functional characteristics of a vapor-liquid contacting system which are associated with high selectivity for hydrogen sulfide absorption relative to the absorption of carbon dioxide. Briefly, the desired functional characteristics of the vapor-liquid contacting system are as follows. First, it is desirable to achieve high gas phase mass transfer rates by turbulence in the gas phase, since increased gas phase turbulence reduces the film resistance of the gas phase and thus facilitates and enhances the absorption of hydrogen sulfide. Second, it is desirable to achieve reduced liquid phase mass transfer rates by virtue of a relatively quiescent liquid phase behavior. This behavior is favorable to low absorption levels for the undesired carbon dioxide component of the gas mixture being separated, since relative quiescence of the liquid phase tends to maximize the liquid phase film resistance to mass transfer. Thirdly, it is desirable to achieve a low liquid phase residence time on the vapor-liquid contacting trays in the contacting system, so as to limit the net loading of gas transferred to the liquid phase. Low liquid phase residence times prevent an undue amount of carbon dioxide from being absorbed by the liquid solvent on the contacting tray, and thus prevent carbon dioxide from being absorbed in the liquid phase to such extent that it interferes with the mass transfer of the desired component hydrogen sulfide.

In accordance with the present invention, it has been discovered that a vapor-liquid contacting tray characterized by the perforated portion of the tray member forming an active surface area for vapor liquid contact in the interior of the tray member, with a perforation open area of from 3 to 5%, by the fixed size openings in the perforated portion of the tray member having a diameter of from 1/16 to 3/32 inch, by the active area portion of the tray member being circumscribed by an imperforate peripheral portion of the tray member with a width of from 0.05 to 0.35 times the radius of the tray, and by the downcomer means having a height measured from the main flat top surface of the tray member of from $\frac{1}{8}$ to $\frac{3}{8}$ inch, satisfies the above criteria in a vapor-liquid contacting system wherein the gas mixture is flowed through the open area perforation openings of the tray member at a velocity of from 50 to 133 ft. per second. Such vapor-liquid contacting means and method have been found to provide unexpectedly high selectivity toward hydrogen sulfide when hydrogen sulfide is absorbed from a gas mixture containing hydrogen sulfide and carbon dioxide by amine liquid solvent.

The unexpectedly high selectivity toward hydrogen sulfide exhibited by the vapor-liquid contacting system of this invention is a consequence of its operation in a novel hydraulic flow regime, termed "laminar jetting", as hereinafter described in greater detail. It has been found that in a vapor-liquid contacting tray constructed in accordance with the present invention, with a perforation open area of from 3 to 5%, fixed sized perforation openings having a diameter of from 1/16 to 3/32 inch, the active surface area portion of the tray member being circumscribed by an imperforate peripheral portion of the tray member with a width of from 0.05 to 0.35 times the radius of the tray, and downcomer means having a height measured from the main flat top surface of the tray member of from $\frac{1}{8}$ to $\frac{3}{8}$ inch, wherein a plurality of such trays are contained in a vapor-liquid contacting column absorption zone and wherein the gas mixture to be treated by absorption is flowed through the open area perforation openings of each tray at a velocity of from 50 to 133 ft/sec, a transition zone is achieved between conventional frothing behavior (liquid in vapor dispersion on the tray member) and the spray regime characterized by excessive entrainment of the liquid in the generally upflowing gas stream. In this relatively broad transition zone, the phenomenon termed laminar jetting is observed. In the laminar jetting regime, vertically upwardly extending "fingers" of liquid are formed directly above the perforation openings of the tray member; in other words, discreet jets of liquid extend upwardly from the layer of liquid on the tray member, above the gas flow perforation openings in the tray member. In this regime, the liquid, condensed in continuous jets, remains relatively non-dispersed, seemingly internally segregated and quiescent in contrast to the highly turbulent dispersed frothing behavior that would normally be characteristic in a conventional tray design at high vapor loads. High selectivity toward hydrogen sulfide is obtain in the laminar jetting regime, which is characterized by high vapor turbulence in connection with a high pressure drop in the vapor phase across the tray and by a liquid phase on the tray member surface which relatively non-dispersed and comparatively well behaved.

Functionally, in a vapor-liquid contacting system employing the trays of the present invention, it is primarily high tray pressure drop, i.e., high velocity of the gas mixture flowing through the open area perforations of the tray member, that is responsible for obtaining the laminar jetting behavior. In conventional tray design for vapor-liquid absorption contacting, the perforated portion of the tray member forms an active surface area for vapor-liquid contact with a perforation open area of from generally 10 to 15%. By contrast, in the vapor-liquid contacting tray of the instant invention, the perforated portion of the tray member forms an active surface area for vapor-liquid contact with a perforation open area of from 3 to 5%. The reduced perforation open area in the tray of this invention, relative to conventionally designed trays, coupled with high gas mixture flow velocity employed in the vapor-liquid contacting system of the present invention, provides the required high gas velocities through the perforation openings of the tray member necessary to sustain the laminar jetting behavior. As mentioned above, the perforation open area for the tray of this invention is from 3 to 5%. At perforation open areas of below 3%, the pressure drop in the vapor space across the tray becomes excessively high, with the result that the hydraulic behavior of the tray enters the spray regime, characterized by high entrainment and loss of the specific advantages of the present invention. At perforation open area values above 5%, hydraulic behavior on the tray degenerates from the laminar jetting regime to the conventionally employed frothing regime. As used herein, the term "perforation open area" refers to the aggregate area of the fixed sized perforation openings distributed across a portion of the tray member, expressed as a percentage value of the total surface area of the tray member (the total surface area of the tray member being equal to the cross-sectional area of the contacting column in which the contacting tray is disposed). In the tray of this invention, the tray member comprises an active surface area portion in the central part thereof, circumscribed by an imperforate peripheral portion of the tray member. The active surface area portion of the tray is disposed inwardly of the imperforate peripheral portion of the tray member and is exclusive of the surface area of the tray occupied by liquid transfer means, i.e., downcomer means and downcomer sealing pans.

The tray of this invention requires that the fixed size openings which are distributed across a portion of the tray member, extending therethrough with walls normal to the main flat top and bottom surfaces of the tray member for gas flow into the liquid on the main flat top surface of the tray member, have a diameter of from 1/16 to 3/32 inch. At fixed size opening diameters of less than 1/16 inch, the liquid jets formed over the gas flow openings are characterized by high levels of dispersion which are detrimental to the selectivity of the gas film controlled absorption reaction. This is due to the fact that high levels of dispersion in the liquid phase reduce the liquid film resistance to mass transfer and thus result in the promotion of the liquid film controlled absorption reaction. As a result, the reduction in the liquid film resistance to mass transfer leads to high levels of absorption of the undesired liquid film controlled constituent. On the other hand, fixed sized perforation opening diameters of greater than 3/32 inch are detrimental inasmuch as they establish too much tangential dispersion from the liquid jets, leading to impingement of adjacent jets and general degradation of the jetting behavior toward more conventional frothing behavior. While in conventional tray design, the diameter of the fixed sized perforation openings may range from about ⅛ to ⅜ inch and above, the laminar jetting behavior of this invention is facilitated at perforation opening diameters in the range of from 1/16 to 3/32 inch.

The tray of the present invention is so constructed that the active surface area portion of the tray member is disposed in the interior of the tray member, with the active surface area portion being circumscribed by an imperforate peripheral portion of the tray member having a width of from 0.05 to 0.35 times the radius of the tray, to prevent interference by the inner wall of the contacting column with vapor-liquid contacting above the active surface area portion of the tray member. The tray of the present invention is designed to minimize liquid phase mass transfer, so as to provide high selectivity toward a gas phase film limited absorption reaction relative to a liquid phase film controlled absorption reaction. Accordingly, as it is sought to minimize liquid phase mass transfer rate, it becomes increasingly important to minimize wall effects. This is due to the fact that in a vapor-liquid contacting tray employed in a contacting column, excessive splashing and coating of the inner column wall with liquid from the tray markedly increases the liquid interfacial area and residence time in the contacting zone. For this reason, an inactive zone is provided around the circumference of the tray to reduce such splashing and coating of the column walls with the liquid solvent being processed in the contacting column absorption zone. As used herein, the phrase "the active surface area portion of the tray member is circumscribed by an imperforate peripheral portion of the tray member" means that the peripheral portion of the tray member is imperforate except for any peripheral portion of the tray member which may be devoted to liquid transfer means, i.e., downcomer means. In the tray of this invention, the imperforate peripheral portion of the tray member has a width of from 0.05 to 0.35 times the radius of the tray. The width of the imperforate peripheral portion should be at least 0.05 times the radius of the tray in order to provide adequate shielding of the column wall from the upwardly extending liquid jets formed over the perforation openings of the active surface area of the tray member. The width of the imperforate peripheral portion of the tray member should be no more than 0.35 times the radius of the tray in order to provide adequate active surface area for vapor-liquid contact. Based on the foregoing considerations, a preferred range for the width of the imperforate peripheral portion of the tray member is from 0.10 to 0.30 times the radius of the tray.

The tray of this invention features liquid discharge downcomer means extending upwardly above the main flat top surface of the tray member to maintain a predetermined height of liquid thereon. Such downcomer means have a height measured from the main flat top surface of the tray member of from ⅛ to ⅜ inch. At downcomer height of less than ⅛ inch, insufficient liquid is maintained on the tray member main flat top surface to form the upwardly extending laminar jets of liquid. The result is excesslive spraying of liquid with a tendency toward undesirable entrainment of liquid in the generally upwardly flowing gas. On the other hand, the downcomer height should not be above ⅜ inch, since above such level an excessive amount of liquid is maintained on the tray member main flat top surface to form the laminar jets of liquid, with the result that there is a tendency for conventional frothing behavior as opposed to the laminar jetting of liquid over the perforation openings in the tray member active surface area.

In connection with the foregoing, it is generally desirable in the broad practice of the present invention to uniformly distribute the fixed size openings across the active surface area portion of the tray member in a regular pattern with a pitch of from ⅛ to ⅜ inch, preferably in a regular triangular pattern with a pitch of from ¼ to 5/16 inch. As used herein, the term "pitch" refers to the center-to-center distance between adjacent fixed size openings in the perforated portion of the tray member. The pitch of the fixed size openings distributed across the active surface portion of the tray member should not be less than ¼ inch in order to maintain low levels of internal dispersion in the liquid jets such as is favorable to the selectivity toward the gas film limited absorption reaction. The pitch of the fixed size openings should not be more than ⅜ inch, since larger pitches tend to establish excessive tangential dispersion between adjacent jets, leading to impingement of these jets and general degradation of the jetting behavior toward conventional frothing behavior.

Although the vapor-liquid contacting tray of this invention may be used in any absorption process wherein it is desired to selectively absorb a gas film limited component from a gas mixture containing a gas film limited component and a liquid film controlled component, the tray has particular utility when employed in a process for absorbing hydrogen sulfide from a gas mixture containing hydrogen sulfide and carbon dioxide by amine liquid solvent in an absorption zone containing a plurality of generally horizontally aligned, vertically spaced-apart perforated trays on which liquid solvent, flowing generally downwardly through the absorption zone from tray to tray, is contacted with upwardly flowing gas mixture. In this process application, it is desirable to provide an open area of from 3 to 5% on each of the trays, formed by fixed size perforation openings of from 1/16 to 3/32 inch diameter. The reasons for these limits are those that were set forth hereinabove in connection with the discussion of the vapor-liquid contacting tray of this invention. In the hydrogen sulfide absorption process, the gas mixture is flowed through the open area perforation openings at a velocity of from 50 to 133 ft/sec, and preferably at a velocity of from 80 to 100 ft/sec. As used in this context, the gas mixture velocity is the velocity of the gas mixture passing through the open area perforation openings, as distinguished from a superficial vapor velocity based on contacting column cross-sectional area. At velocity values below 50 ft/sec, the vapor velocity is not sufficiently high to form the desired upwardly extending laminar jets of liquid, and instead the hydraulic regime on the vapor-liquid contacting tray is within the regime of conventional frothing behavior. At gas mixture velocity values of above 133 ft/sec, the upwardly extending laminar jets of liquid tend to become unstable and the overall hydraulic behavior of the tray tends to degrade toward a spray regime, characterized by excessive levels of entrainment of liquid in the upflowing gas. In addition, in the hydrogen sulfide absorption application, the liquid height of the amine solvent on the trays in the absorption zone should be in the range of from ⅛ to ⅜ inch. Such liquid height is desired to efficiently form the laminar jets of liquid over the tray perforation openings for enhanced solvent-gas mixture contacting and selective hydrogen sulfide absorption. The above-mentioned liquid height range is associated with and controlled by downcomer means for the vapor-liquid contacting tray having a height measured from the main flat top surface of the tray member of from $\frac{1}{8}$ to $\frac{3}{8}$ inch, which is employed in the practice of the present invention for the reasons set forth herein above. At a liquid height of less than $\frac{1}{8}$ inch, there is insufficient liquid on the tray surface to form the upwardly extending laminar jets of liquid, with the result that the hydraulic behavior of the tray tends to lie in the undesirable spray regime. At liquid height values above $\frac{3}{8}$ inch, there tends to be an excessive amount of liquid resident on the tray surface, with the result that frothing behavior occurs on the tray main flat top surface rather than the desired laminar jetting behavior. For the selective hydrogen sulfide absorption process, a preferred amine liquid solvent is an aqueous solution of methyl diethanolamine.

Referring now to the drawings, FIG. 1 shows a plan view of a vapor-liquid contacting tray constructed in accordance with the present invention. The tray 10 may be suitably employed in a contacting column to effect intimate contact between rising vapor and liquid flowing on a generally horizontally aligned member of the tray having main flat top and bottom surfaces along a liquid flow path on the main flat top surface to liquid discharge downcomer means 14 and 15 extending upwardly above the main flat top surface of the tray member to maintain a predetermined height of liquid thereon, with a plurality of fixed size perforation openings 12 distributed across a portion of the tray member and extending therethrough with walls normal to the main flat top and bottom surfaces for gas flow into the liquid on the main flat top surface of the tray member. The tray, as employed in the contacting column, is bounded at its outer edges by an inner wall of the column.

As shown in the drawing, the perforated portion of the tray member forms an active surface area 11 for vapor liquid contact in the interior of the tray member, with a tray perforation open area of from 3 to 5%. The fixed size openings 12 have a diameter of from 1/16 to 3/32 inch. The active surface area portion 11 of the tray member is circumscribed by an imperforate peripheral portion 13 of the tray member with a width W of from 0.05 to 0.35 times the radius R of the tray, to prevent interference by the inner wall of the contacting column with vapor-liquid contacting above the active surface area portion 11 of the tray member. The downcomer means 14 and 15 have a height measured from the main flat top surface of the tray member of from $\frac{1}{8}$ to $\frac{3}{8}$ inch.

As shown in the drawing, the tray of FIG. 1 employs two discreet downcomer means 14 and 15 for liquid transfer from the tray to the active surface area of the next underlying tray. Although in the broad practice of the present invention single downcomer means may be employed in a cross flow tray configuration, for relatively large vapor-liquid contacting trays, i.e., those having a diameter of at least 18 inches, multiple downcomer means are preferred in order to maintain a suitably low liquid height on the trays for obtaining upwardly directed laminar jetting of liquid over the tray perforation openings. The downcomers 14 and 15 of the FIG. 1 tray are spaced symmetrically across the tray surface from one another, so that each downcomer serves an equal portion of the active surface area for vapor-liquid contact 11. The downcomers each have spout openings 16 in the bottom floor thereof, for discharge of liquid from the downcomer onto the active surface area portion of the underlying tray.

Figure 2:
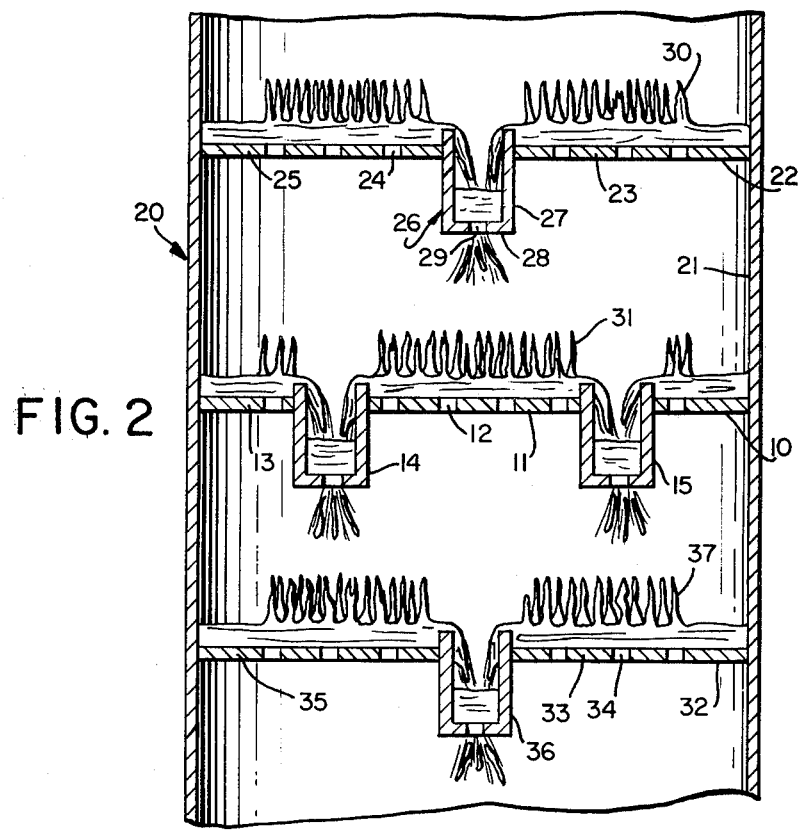
FIG. 2 is a sectional elevational view of a contacting column wherein vapor-liquid contacting trays constructed in accordance with the invention are disposed.

FIG. 2 is a sectional, elevational view of a plurality of vapor-liquid contacting trays in a contacting column. The illustrated portion of the contacting column 20 includes three generally horizontally aligned, vertically spaced-apart perforated trays 22, 10 and 32. The middle tray 10 is of a type as shown in FIG. 1, while the upper and lower trays 22 and 32 respectively are of a type having only a single central downcomer means. As an alternative to the arrangement shown, the contacting column could employ trays which are all of a type as shown in FIG. 1, each tray featuring two spaced-apart downcomers. In such case it would be necessary to rotate successive trays in a horizontal plane by 90° relative to one another, so that the downcomers of an overlying tray do not discharge liquid directly into the downcomers of underlying trays. For such alternative arrangement, the liquid discharge openings in the floors of the respective downcomers would be positioned so as to discharge liquid onto the active surface area portions of the underlying trays.

Referring to FIG. 2, the uppermost tray 22 features a central perforated portion 23 for vapor-liquid contact, having perforation openings 24 regularly distributed thereacross. The active surface area perforated portion of the tray member is circumscribed by an imperforate peripheral portion 25 of the tray member with a width as for example of 0.25 times the radius of the tray. All of the vapor-liquid contacting trays in the contacting column 20 are bounded at their edges by the inner wall 21 of the column. As mentioned, tray 22 features a single downcomer means 26 for the purpose of transferring liquid from the tray main top surface to the underlying tray 10. Downcomer means 26 is located in the central portion of the active surface area perforated portion of the tray member and is constructed with sidewalls 27 which extend vertically upwardly above the main flat top surface of the tray member and below the tray member to a uniform depth. At their lower ends, the sidewalls 27 are connected with a horizontally extending floor member 28 having liquid outlet opening 29 therein for transfer of discharged liquid onto the active surface area poriton of the underlying tray. The liquid outlet opening 29 is sized so as to maintain a liquid seal in downcomer 26 so as to prevent gas bypassing therethrough during operation.

As the vapor contacting the liquid passes upwardly through the perforations 24 of the active surface area perforated portion 23 of the tray member, upwardly extending laminar jets of liquid 30 are formed above the perforation openings 24 as shown. Such laminar jets of liquid are relatively quiescent and entail a substantial liquid film resistance to mass transfer. Thus, the laminar jet form of liquid above the tray surface tends to resist absorption of liquid film controlled components in the gas phase being contacted while favoring the absorption of gas film controlled components of the gas mixture being contacted. In this manner, the vapor-liquid contacting tray promotes high selectivity toward the gas phase component which is gas film controlled while suppressing absorption of the liquid film controlled component of the gas mixture being contacted. The imperforate peripheral portion 25 of the tray member prevents interference by the inner wall 21 of the contacting column with vapor-liquid contacting above the active surface area portion 23 of the tray member.

From the uppermost tray 22, liquid from the main flat top surface of the vapor-liquid contacting tray overflows the weir-like upper ends of the sidewalls 27 of the downcomer 26 and is discharged from the downcomer through liquid outlet opening 29 in the bottom floor member 28 of the downcomer to the active surface area portion 11 of the underlying tray 10. The active surface area portion 11 of the underlying tray is perforated with a plurality of fixed size perforation openings 12 through which gas passes into the liquid on the main flat top surface of the tray member, forming the upwardly extending laminar jets 31 from the liquid on the main flat top surface of the tray member. As in the case of the uppermost tray, tray 10 has a perforated portion forming an active surface area for vapor-liquid contact which is circumscribed by an imperforate peripheral portion 13 of the tray member. Liquid from the active surface area perforated portion of the tray member flows over the upper ends of the sidewalls of the downcomer means 14 and 15 and is discharged onto the active surface area portion of the lowermost tray 32. Tray 32 has a central active surface area portion with perforation openings 33 circumscribed by imperforate peripheral portion 35. The liquid on the active surface area portion of the tray member forms upwardly directed laminar jets of liquid 37 over the tray perforation openings 34 of the tray member active surface area portion 33. Liquid from the active surface area portion of the tray member overflows the upper ends of the sidewalls of the downcomer means 36 and is discharged therefrom to a still lower tray in the contacting column. In this manner, the liquid solvent in the absorption zone flows generally downwardly through the absorption zone from tray to tray and is contacted with upwardly flowing gas mixture, while upwardly directed laminar jetting of liquid is obtained over the tray perforation openings for solvent-gas mixture contacting and selective absorption of the gas film limited component of the gas mixture.

Figure 3:
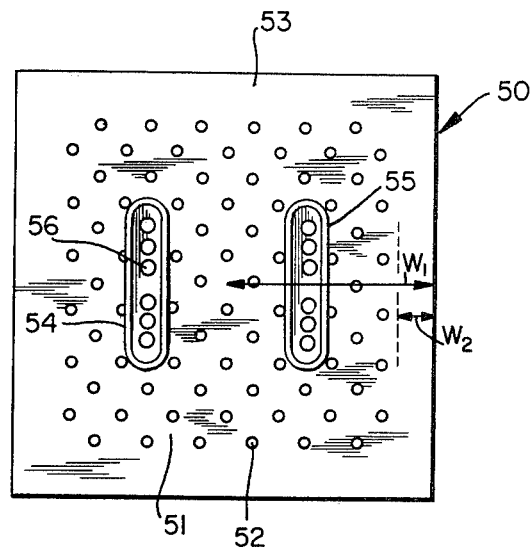
FIG. 3 is a plan view of a vapor-liquid contacting tray according to another embodiment of the invention.

FIG. 3 is a plan view of a rectangular vapor-liquid contacting tray constructed in accordance with the present invention. The tray 50 comprises a tray member having main flat top and bottom surfaces with a plurality of fixed size perforation openings 52 distributed across a portion 51 of the tray member and extending therethrough with walls normal to the main flat top and bottom surfaces for gas flow into the liquid on the main flat top surface of the tray member. The perforated portion 51 of the tray member forms an active surface area for vapor-liquid contact in the interior of the tray member, with a perforation open area of from 3 to 5%. The fixed size openings have a diameter of from 1/16 to 3/22 inch. The active surface area portion 51 of the tray member is circumscribed by an imperforate peripheral portion 53 of the tray member with a width $W_2$ of from 0.05 to 0.35 times the "radius" $W_1$ of the tray. As used herein in application to a rectangular or square tray, the term "radius of the tray" is intended to refer to the half-width $W_1$ of the tray. As shown, the tray 50 features two liquid discharge downcomer means 54 and 55 which extend upwardly above the main flat top surface of the tray member to maintain a predetermined height of liquid thereon. Each of the downcomer means has a bottom floor member with liquid outlet openings 56 therein for transfer of liquid from the tray to the active surface portion of the underlying tray in the contacting column.

Figure 4:
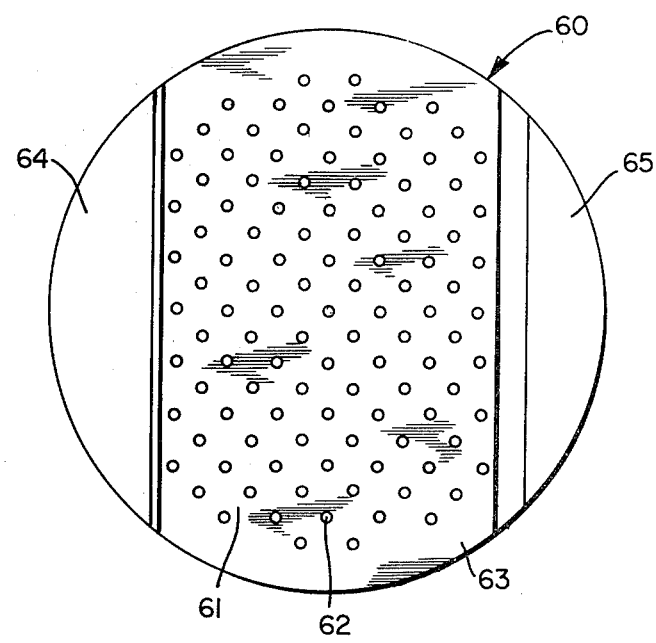
FIG. 4 is a plan view of a vapor-liquid contacting tray constructed according to still another embodiment of the invention.

FIG. 4 shows a plan view of a vapor-liquid contacting tray according to another embodiment of the present invention. The tray 60 is of a cross-flow type, with an imperforate liquid receiving pan 64 at one edge thereof and a downcomer 65 at an opposite edge thereof. In this configuration, liquid from the downcomer means of an overlying tray impinges on the liquid receiving pan 64 and flows therefrom across the active surface area portion 61 of the tray member to the downcomer 65 at the opposite end of the tray. The perforated portion 61 of the tray member is disposed in the interior thereof, with a plurality of perforation opening 62 distributed thereacross. The active surface area portion 61 of the tray member is circumscribed by an imperforate peripheral portion 63 of the tray member, with the inlet and outlet regions of the active surface area being circumscribed by the imperforate liquid receiving pan 64 and the downcomer means 65 respectively. The active surface area portion 61 of the tray member has fixed size opening uniformly distributed across the active surface area portion in a regular pattern, with a pitch of from $\frac{1}{4}$ to $\frac{3}{8}$ inch, and preferably in a regular triangular pattern with a pitch of from $\frac{1}{4}$ to 5/16 inch.

Figure 5:
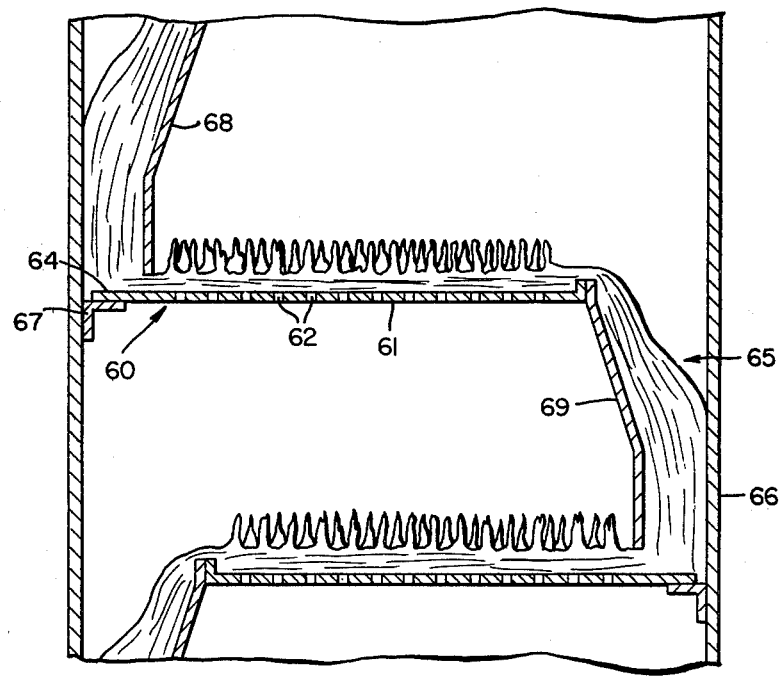
FIG. 5 is a sectional elevational view of a tray of the type shown in FIG. 4, mounted in a contacting column.

FIG. 5 is a sectional elevational view of a portion of a vapor-liquid contacting column 66 containing the vapor-liquid contacting tray 60 of FIG. 4. As shown, liquid from the overlying tray passes downwardly through the downcomer means of the upper tray formed by downcomer sidewall 68 and the inner wall of the column 66. The lower end of the downcomer sidewall 68 terminates closely adjacent to the generally horizontal surface of the vapor-liquid contacting tray 60 in order to form a liquid seal therewith. Tray 60 is attached to the inner wall of the column 66 by means of angle brace member 67. Liquid from the overlying downcomer impinges on the liquid sealing pan 64 of the vapor-liquid contacting tray and flows horizontally across the active surface area portion 61 of the tray member having perforation opening 62 therein to the outlet end of the tray, at the right-hand side thereof. The gas phase flowing upwardly through the contacting column through perforation openings 62 in the active surface area portion 61 of the tray member forms upwardly directed laminar jets of liquid over the perforation openings 62 for vapor-liquid contacting and selective absorption. Liquid in the outlet region of the tray member flows over the upper end of the downcomer sidewall 69 of the downcomer 65 and flows downwardly to the liquid receiving pan of the next underlying tray. In this manner, the liquid flows across each of the vapor-liquid contacting trays through the absorption zone from tray to tray and is contacted on the tray main top surfaces with upwardly flowing vapor.

Figure 6:
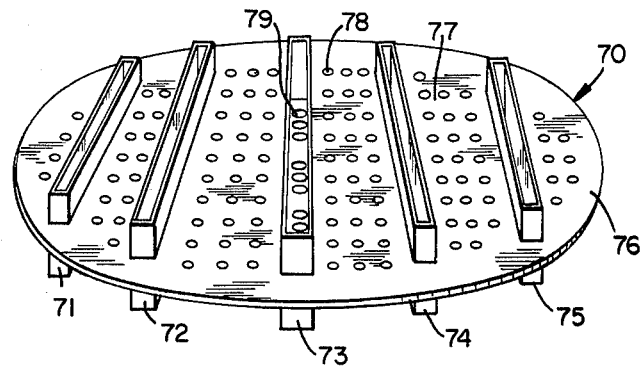
FIG. 6 is an isometric view of a vapor-liquid contacting tray constructed in accordance with yet another embodiment of the present invention.

FIG. 6 is an isometric view of a vapor-liquid contacting tray according to another embodiment of the present invention. The tray configuration shown in FIG. 6 is particularly suited to large diameter vapor-liquid contacting trays, on the order of from 6 to 12 feet in diameter. The tray features a perforated portion 77 of the tray member which forms an active surface area for vapor liquid contact in the interior of the tray member, with a plurality of fixed size perforation opening 78 distributed thereacross. The active surface area portion 77 of the tray member is circumscribed by an imperforate peripheral portion 76 of the tray member with a width of from 0.05 to 0.35 times the radius of the tray and preferably with a width of from 0.10 to 0.30 times the radius of the tray. The tray also features multiple, narrow, trough-like downcomer means 71, 72, 73, 74 and 75 which are evenly spaced across the tray surface and extend through the perforated active surface area portion of the tray member such that the perforated active surface area portion is divided into sections of substantially equal surface area per unit length of adjacent downcomer means.

The perforated active surface area portion provides an active major portion of the tray surface area to support liquid for mass exchange. Each downcomer means comprises two spaced longitudinal inlet edges each adjacent to a section of the active portion of the tray surface and extending across the tray. These longitudinal inlet edges are associated with imperforate relatively long and deep longitudinal sidewalls and imperforate relatively short transverse end walls which define a discreet inactive portion of the tray surface area, provide an upper inlet end section for receiving a fraction of the liquid from the tray and permitting vapor to disengage therefrom, and provide a lower outlet end section for collecting disengaged liquid and discharging such disengaged liquid from the tray. Each downcomer means further comprises a horizontally extending floor member attached to the outlet end section of the downcomer having a multiplicity of longitudinally spaced spout opening 79 therein so constructed that a sealing effect against vapor penetration may be provided by a stable head loss of liquid passing therethrough such that a pool of disengaged liquid may be maintained in the downcomer means. The tray thus comprises precisely defined areas for vapor flow upward through the perforated active surface area portion 77 of the tray member and precisely defined areas for liquid flow downward through the multiple downcomer means 71-75.

As shown in FIG. 6, the multiple downcomer means 71-75 are positioned parallel to one another across the tray surface. Each downcomer extends substantially from one edge of the active surface area portion of the tray to an opposite edge thereof along the respective chord of the tray defined by the downcomer.

As a general rule, adequate liquid height control on the tray will be achieved with the multiple downcomer tray of FIG. 6 by providing between about 1.0 and 5.0 feet of downcomer inlet length per square foot of active surface area (perforated portion tray area). If liquid loading is so low that less than about 1.0 ft. of downcomer inlet length can serve a square foot of tray active surface area efficiently, liquid height control and gradient are not highly critical and can be handled reasonably well on trays of a cross-flow configuration, such as shown in FIGS. 4 and 5 herein. On the other hand, if more than about 5.0 ft. of downcomer inlet length is provided per square foot of active surface area of the tray member, then it is apparent that even though downcomers which make highly efficient use of their area are employed, these downcomers occupy an excessively large fraction of the total tray surface. For example, 5.0 ft. of downcomer inlet length per square foot of tray area provided by 2 inch wide downcomers results in about 40% utilization of the tray surface area for downcomers. More than 5.0 ft. of downcomer inlet length per square foot of active surface area of the tray member requires very close spacing of the downcomers and leaves such a narrow width of the perforated active area portion between the downcomers that it becomes difficult to receive the liquid falling onto the surface of the tray from the tray above without spilling a portion directly into the downcomers. In order to provide highly efficient liquid capacity at high liquid flow rates for the multiple downcomer configuration of FIG. 6, the width of the downcomer inlet should be between about 0.07-0.4 of the center-to-center spacing of the downcomers across the tray.

Figure 7:
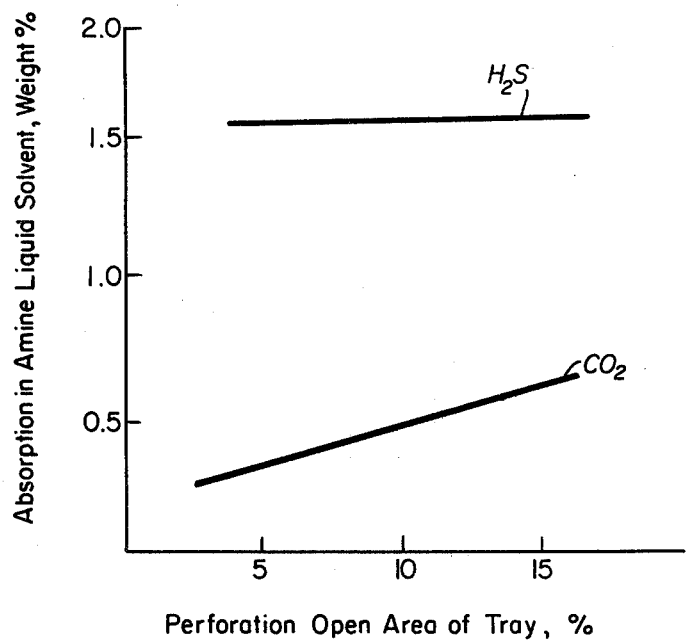
FIG. 7 is a graph of the absorption in amine liquid solvent, in weight percent of hydrogen sulfide and carbon dioxide, plotted as a function of perforation open area of a contacting tray, in percent.

As mentioned earlier herein, the vapor-liquid contacting trays of the present invention may most advantageously be employed for absorbing hydrogen sulfide from a gas mixture containing hydrogen sulfide and carbon dioxide by an amine liquid solvent in an absorption zone containing a plurality of generally horizontally aligned, vertically spaced-apart perforated trays of such type on which liquid solvent, flowing generally downwardly through the absorption zone from tray to tray, is contacted with upwardly flowing gas mixture. FIG. 7 shows a graph of absorption in amine liquid solvent, in weight percent, for hydrogen sulfide and carbon dioxide, plotted as a function of perforation open area of the tray, expressed as a percent of the total tray area. The perforation open area of the tray in percent reflects the fractional open area of the tray member which defines an active surface area for vapor-liquid contact.

The tray employed to generate the data of FIG. 7 had a downcomer height of $\frac{1}{8}$ inch. A gas mixture containing 6 vol% hydrogen sulfide and 94 vol% carbon dioxide, flowing upwardly at a rate of 14 cubic feet per minute, was contacted on the tray with a liquid solvent containing 50% by weight water and 50% by weight methyl diethanolamine at a liquid flow rate of 800 cc/min. The total pressure in the contacting system was 10 psig and the temperature was 100° F.

The graph of FIG. 7 shows that the weight percent hydrogen sulfide absorbed in the liquid amine solvent remains relatively constant regardless of the perforation open area of the tray, while the weight percent carbon dioxide absorption shows a rapid increase with increasing perforation open area. Inasmuch as it is generally desired to absolutely minimize the weight percent absorption of carbon dioxide relative to the weight percent absorption of hydrogen sulfide, FIG. 7 shows that a tray constructed in accordance with the present invention having a perforation open area of no more than 5% of the total area of the tray member is able to maintain the weight percent absorption of carbon dioxide at a level well below 0.5%. The vapor-liquid contacting system from which the data of the FIG. 7 was generated employed fixed size perforation openings distributed across the active surface area portion of the tray member in a regular triangular pattern, with the fixed size perforation openings having a diameter of 3/32 inch.

Figure 8:
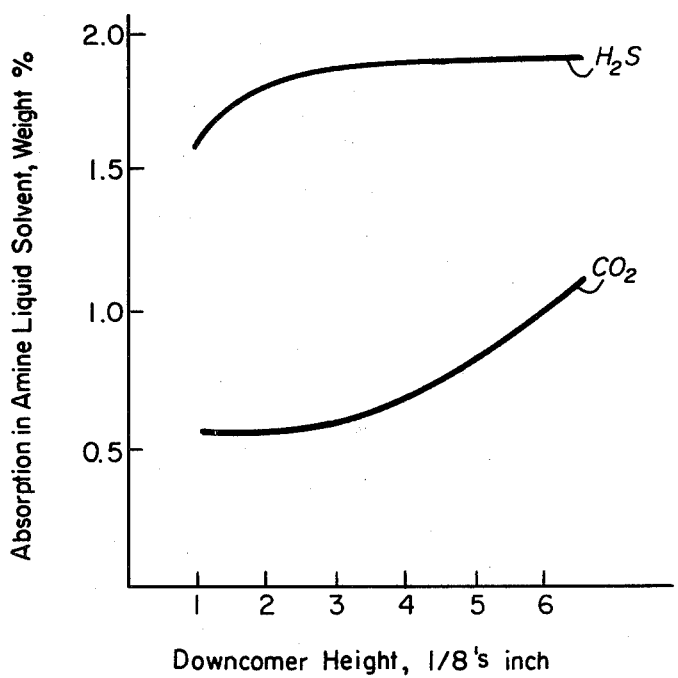
FIG. 8 is a graph of absorption in amine liquid solvent, in weight percent of hydrogen sulfide and carbon dioxide, plotted as a function of downcomer height of a vapor-liquid contacting tray, as measured in eighths of an inch.

FIG. 8 shows a graph of weight percent absorption in amine liquid solvent, for hydrogen sulfide and carbon dioxide, plotted as a function of a downcomer height in eighths of an inch. The vapor-liquid contacting system was the same as employed in FIG. 7, but with a perforation open area of 15%. The downcomer height plotted on the X-axis in FIG. 8 is the height of the liquid discharge downcomermeans extending upwardly above the main flat top surface of the tray member. The graph of FIG. 8 shows that in order to minimize the absorption of carbon dioxide relative to the weight percent absorption of hydrogen sulfide, it is desirable that the downcomer means has a height measured from the main flat top surface of the tray member of from 1/8 to 3/8 inch.

In the broad practice of the present invention, the vapor-liquid contacting tray of the present invention employs an active surface area portion of the tray member which is circumscribed by an imperforate peripheral portion of the tray member with a width of from 0.05 to 0.35 times the radius of the tray. With such values of the ratio of the width of the imperforate peripheral portion to the radius of the tray, it is possible to maintain a large portion of the total surface area of the tray as active surface area for vapor-liquid contact. This is shown by the Table below, in which the ratio of the width of the imperforate peripheral portion to the radius of the tray is tabulated, along with corresponding values for the ratio of the area of the imperforate peripheral portion to the total surface area of the tray. Thus, for example, with a width of the imperforate peripheral portion of the tray member which is 0.23 times the radius of the tray, the corresponding area of the imperforate peripheral portion is 40% of the total surface area of the tray, so that 60% of the total surface area of the tray remains for use as the active surface area for vapor liquid contact and for downcomer means.

TABLE

| Width of Imperate Peripheral Portion Radius of the Tray | Area of Imperforate Peripheral Portion Surface Area of the Tray |
|---|---|
| 0.05 | .0975 |
| 0.23 | .4000 |
| 0.35 | .5775 |

Although the utility of the tray constructed in accordance with this invention has been discussed hereinabove particularly in application to the absorption of hydrogen sulfide from a gas mixture containing hydrogen sulfide and carbon dioxide by an amine solvent, it will be appreciated that the utility of the invention is not so limited, but rather extends to any absorption system in which a gas film limited component is being absorbed from a gas mixture containing the gas film limited component and a liquid film limited component by a liquid solvent.

What is claimed is:

1. In a process for absorbing hydrogen sulfide from a gas mixture containing hydrogen sulfide and carbon dioxide by an amine liquid solvent in an absorption zone containing a plurality of generally horizontally aligned, vertically spaced-apart perforated trays on which liquid solvent, flowing generally downwardly through the absorption zone from tray to tray, is contacted with upwardly flowing gas mixture, the improvement comprising:

(a) providing an open area of from 3 to 5% on each of said trays, formed by fixed size perforation openings of from 1/16 to 3/32 inch diameter;

(b) flowing said gas mixture through said open area perforation openings at a velocity of from 50 to 133 ft/sec; and (c) maintaining the liquid height of said amine solvent on said trays in the range of from 1/8 to 3/8 inch, whereby upwardly directed laminar jetting of liquid is obtained over said tray perforation openings for solvent-gas mixture contacting and selective hydrogen sulfide absorption.

2. A process according to claim 1 wherein said amine liquid solvent comprises an aqueous solution of methyl diethanolamine.

3. A process according to claim 1 wherein said gas mixture flow velocity through said open area perforation openings is from 80 to 100 ft/sec.

* * * * *